March 20, 1956 P. Q. R. SCHREIBER 2,738,629
TOBACCO CUTTER GRINDING MEANS

Filed April 4, 1950 3 Sheets-Sheet 1

Inventor
PATRICK QUINTIN ROBERT SCHREIBER,

By Robert B Larson

Attorney

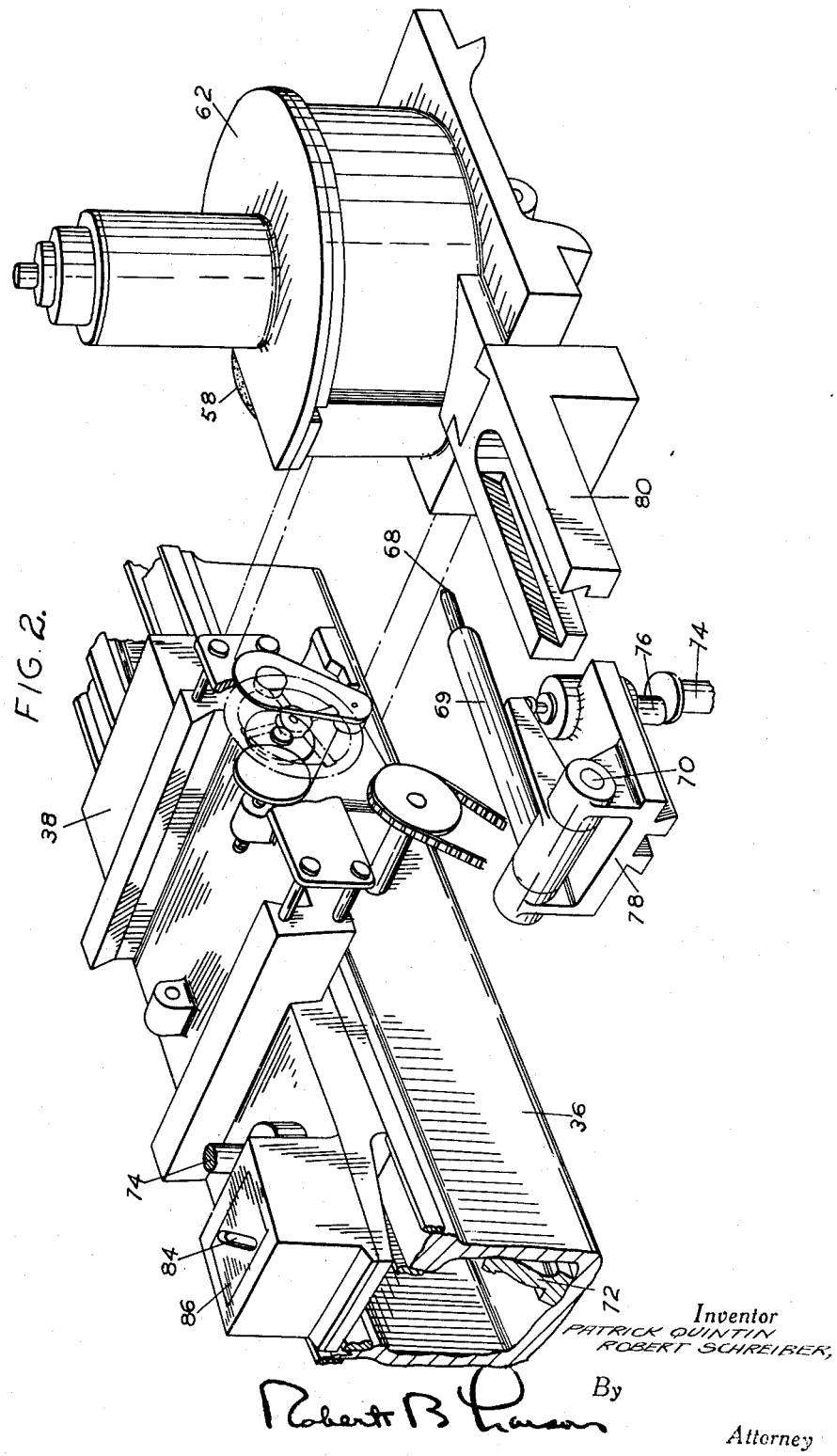

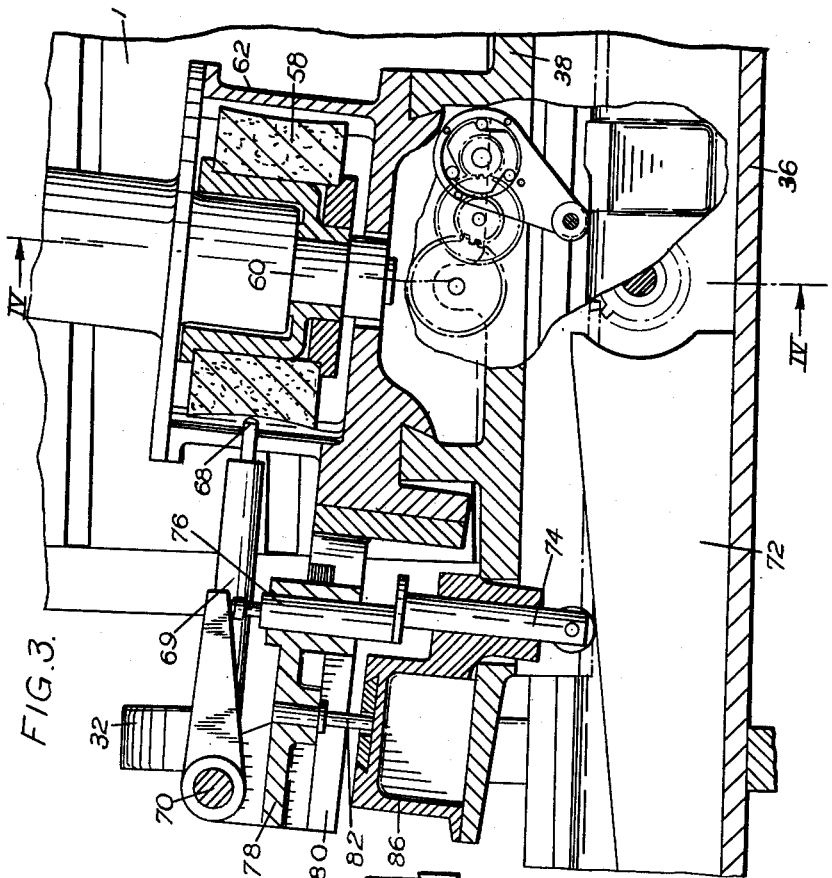
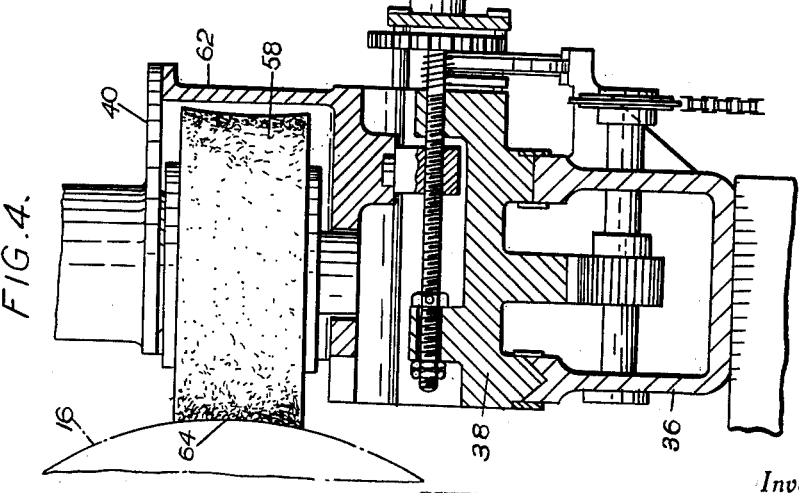

United States Patent Office 2,738,629
Patented Mar. 20, 1956

2,738,629

TOBACCO CUTTER GRINDING MEANS

Patrick Quintin Robert Schreiber, Surrey, England, assignor to Robert Legg Limited, London, England, a British company Application April 4, 1950, Serial No. 153,809

Claims priority, application Great Britain April 5, 1949

2 Claims. (Cl. 51—249)

The present invention relates to the sharpening of rotary cutters having cutting edges which may be geometrically defined as lying in a cylindrical surface. One important application of the invention is to apparatus for cutting leaf tobacco. In such apparatus leaf tobacco is compressed and fed through a mouthpiece and as it emerges is cut into thin slices by a cutter which may be a single reciprocating knife or may be a rotary drum carrying one or more knives. Particular problems of sharpening arise with apparatus in which a rotary cutter is used since it is most desirable to be able to sharpen the knives without the waste or time involved in removing them from the drum. In fact the wear on the knives caused by the toughness of leaf tobacco makes it desirable to sharpen the knives of rotary cutters continuously while cutting is in progress.

It is usual practice to sharpen rotary cutters, including those of apparatus for cutting tobacco, by means either of a disc or cup grinding wheel. A disc wheel is disposed with its axis parallel to the axis of the cutter, while a cup wheel is disposed with its axis perpendicular to and intersecting the axis of the cutter. In each case the line of interengagement between the grinding wheel and the cutter is a short straight line parallel to the axis of the cutter. Accordingly the wheel actually engages the cutter only intermittently at instants when a cutting edge lies on this straight line. For the greater part of the time during which grinding is supposedly occurring the wheel is not in fact in engagement with any cutting edge, and as each cutting edge does come into engagement the rotating cutter is subject to undesirable jarring. Moreover the attempt to remove the necessary amount of metal during the very brief instants of engagement results in unfair treatment of the cutting edges.

It is an object of the invention to provide an apparatus for sharpening rotary cutters in which a grinding wheel is actually in engagement with the cutter for a greater proportion of the period of grinding.

It is a further object of the invention to provide apparatus for sharpening rotary cutters by the use of which cutters may be rapidly sharpened without unfair treatment of the cutting edges.

It is a further object of the invention to provide apparatus for cutting leaf tobacco in which a rotary cutter is continuously ground to a constant effective diameter.

Further objects and advantages of the present invention will appear from the following description of one embodiment, reference being made to the accompanying drawings in which:

Figure 2 is an exploded perspective view on a larger scale of the grinding device;

Figure 3 is an elevation of the grinding device looking from one end of the machine, the device being in section on a plane containing the axis of the grinding wheel; and Figure 4 is an elevation of the grinding device in section on the line IV—IV in Figure 3.

Figure 1:
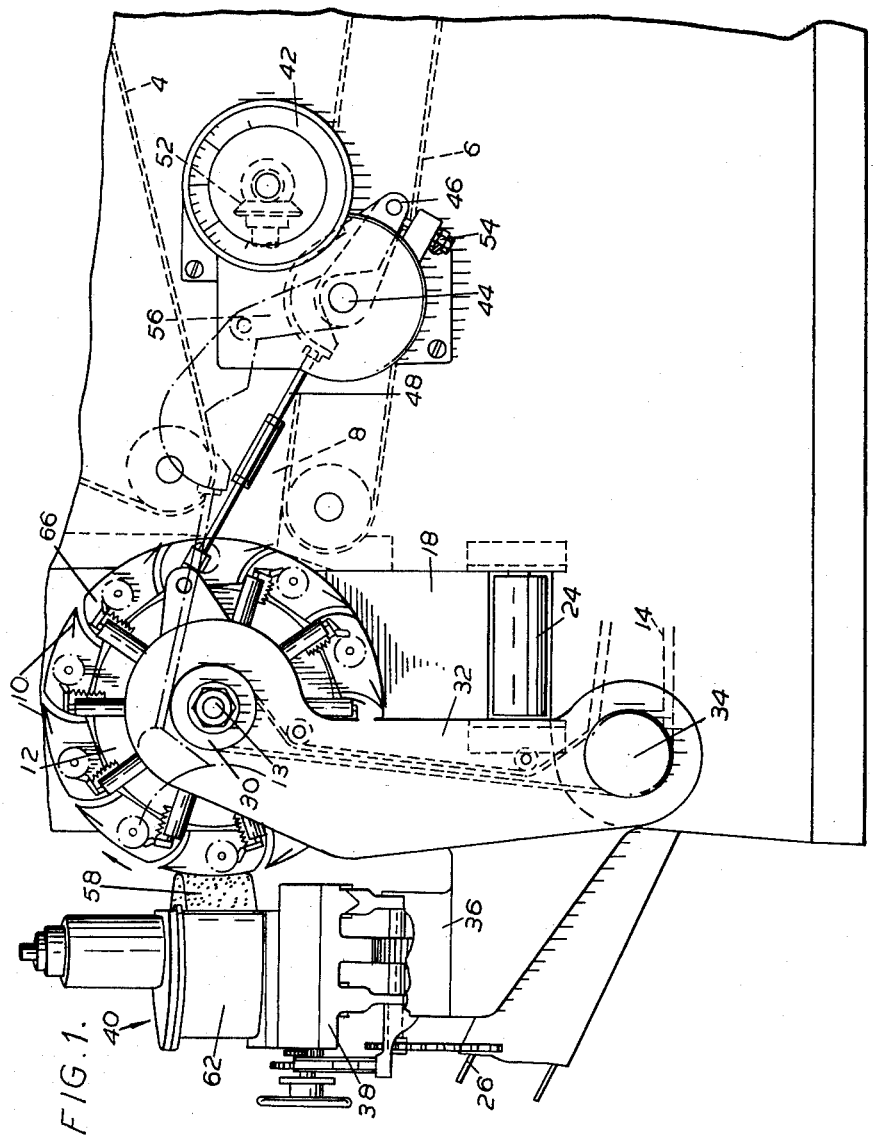
Figure 1 is an elevation of one side of the machine.

First considering Figure 1 of the drawing, leaf tobacco is fed into the space between two converging conveyor belts 4 and 6 which carry the tobacco to a mouthpiece 8 and at the same time compress it so that it is driven through the mouthpiece as a plug. As the plug emerges it is shredded by knives 10 on a drum 12 which is turned on a shaft 13 by a drive 14. The cutting edges of the knives all lie in an imaginary cylindrical surface which is indicated at 16 in Figure 4, and they are very slightly inclined to lines parallel to the axis of the drum so that they engage the tobacco progressively at each cut. The cut tobacco is carried clear of the drum by an air blast set up in ducts such as 18 by a fan (not shown) and is then removed by conveyors 24 and 26.

The shaft 13 carrying the drum 12 is carried in bearings 30 at the ends of arms 32. These arms are each pivoted at 34 to the base of the machine and together form a support both for the drum and for a bed 36 on which slides a carrier 38 forming the bottom of a grinding device 40. The support can rock to and from the mouthpiece under the control of a linkage operated by a handwheel 42. This linkage includes a shaft 44 which carries on each end a crank 46. The cranks are each connected to an arm 32 by a pivoted link 48, and are arranged so that the small movement of the drum necessary to adjust the clearance between the cutting edges and the mouthpiece is brought about by movement of the cranks through an arc slightly to one side of a dead centre position. The shaft 44 is turned by the handwheel 42 through a worm drive (not shown) and bevel gears 52. Movement of the cranks in the direction to reduce the clearance is limited by a stop 54.

If it is desired to inspect the mouthpiece 8, the shaft 44 can be turned to move the cranks 46 into a position 56 in which the arms 32 are rocked the full distance permitted by the throw of the cranks.

The grinding device 40 incorporates a disc grinding wheel 58 mounted to turn on a shaft 60 in a housing 62. The inclination of the shaft 60 is shown in Figure 3, and the hollowing of the rim of the grinding wheel 58 to match the cylinder 16 is shown at 64 in Figure 4. This grinding wheel 58 is caused to sharpen the full length of the cutting edges of the knives 10 by reciprocation of the carrier 38 on the bed 36. The speed of travel of the carrier should be such that in each revolution of the cutter the carrier moves a distance rather less than the projection on the axis of the cutter of the helical arc of engagement between the rim of the grinding wheel 58 and the cylinder 16.

As the cutting edges of the knives 10 are continuously sharpened, metal is worn away from them, and at the same time the rim of the grinding wheel 58 is also worn away. Arrangements are made to compensate for this wear and so maintain a constant diameter of the cylinder 16. The knives 10 are progressively fed outwards in their holders by mechanisms such as those described and claimed in my Patent No. 2,614,596 issued October 21, 1952. This mechanism operates to move the knives outwards a small distance each time the carrier 38 reaches the end of a stroke and the grinding wheel 58 is just clear of the cutter.

The housing 62 and with it the grinding wheel 58 is movable on the carrier 38 and is gradually fed towards the drum 12. At the same time the contour 64 of the rim of the grinding wheel 58 is maintained by dressing with a diamond 68. This diamond is at the end of an arm 69 which can swing about an axis 70, the radius of the diamond from that axis being slightly greater than that of the cylinder 16. The arm 69 is caused to swing up and down at each reciprocation of the carrier 38 by means of a fixed cam 72, a follower 74, and a push rod 76. Thus the full thickness of the rim of the wheel is dressed. Moreover the arm 69 is carried on a slide 78 movable on an extension 80 of the housing 62. The movement of the slide 78 is controlled by the engagement of a pin 82 in a slot 84 in a block 86 on the carrier 38. This slot 84 is inclined at 45° to the line of travel of the housing 62 and thus as the wheel 58 is moved towards the drum 12 by a certain amount so the diamond is moved towards the wheel by the same amount. As a result the wheel 58 gradually decreases in diameter but maintains a constant diameter of the cylinder 16, as the cutting edges of the knives 10 are progressively fed outwards and ground away.

I claim:

1. In a tobacco cutting machine having a rotary cutter with a plurality of radially adjustable axially extending knife blades spaced around the periphery thereof, which blades are movable outwardly to maintain the edges at a constant radius as they are sharpened, sharpening means for said knife blades comprising, a grinding wheel maintained to engage said knife edges, means for rotating said grinding wheel, a carrier for mounting said grinding wheel, a wheel dresser mounted on said carrier to engage said grinding wheel, means for moving said carrier whereby said grinding wheel engages the full length of the knife edges, cam means operative between said wheel dresser and a fixed support to cause the wheel dresser to engage the entire outer surface of the grinding wheel during the movement of the carrier and during rotary movement of said grinding wheel, means for moving said wheel toward said cutter normally with respect to the carrier movement to compensate for the decreased radius of said wheel, means for moving said dresser toward said wheel, and means coordinating the movement of said wheel toward the cutter and the movement of said dresser toward the wheel so that said dresser moves a distance toward said wheel simultaneously with and equal to the movement of said wheel toward said cutter whereby the knife blades of said rotary cutter can be maintained in a sharpened condition and at the correct diameter.

2. An arrangement according to claim 1, in which said grinding wheel has a slightly hollowed rim and is mounted on said carrier with the plane of said wheel inclined at a small angle to the axis of said cutter so as to bring said wheel into engagement with said cutter over a fine pitched helical arc on the cylindrical surface of said cutter, said carrier moving means being adapted to move said wheel axially of said cutter a distance slightly less than the projection on the axis of said cutter of the helical arc of contact between said grinding wheel and said cylindrical surface for each revolution of said cutter.

References Cited in the file of this patent

UNITED STATES PATENTS

| | | |
|---|---|---|
| 129,548 | Grant | July 16, 1872 |
| 1,169,377 | Barnhart | Jan. 25, 1916 |
| 1,769,870 | Traud | July 1, 1930 |
| 1,933,181 | Molins et al. | Oct. 31, 1933 |
| 1,997,862 | Halborg et al. | Apr. 16, 1935 |
| 2,026,096 | Muhlbauer | Dec. 31, 1935 |
| 2,115,908 | Fox | May 3, 1938 |
| 2,121,879 | Lorentz | June 28, 1938 |
| 2,140,860 | Steele | Dec. 20, 1938 |
| 2,156,562 | Cramer | May 2, 1939 |
| 2,172,032 | Philippe | Sept. 5, 1939 |
| 2,292,269 | Gooch | Aug. 4, 1942 |
| 2,327,272 | Jones et al. | Aug. 17, 1943 |
| 2,464,896 | Schreiber | Mar. 22, 1949 |
| 2,476,177 | Bloom et al. | July 12, 1949 |
| 2,479,101 | Dahl | Aug. 16, 1949 |